(12) United States Patent
Davenport et al.

(10) Patent No.: US 6,302,571 B1
(45) Date of Patent: Oct. 16, 2001

(54) WATERPROOF SYSTEM FOR DELIVERING LIGHT TO A LIGHT GUIDE

(75) Inventors: John M. Davenport, Lyndhurst; Roger F. Buelow, II, Cleveland Heights, both of OH (US); Eric J. Haugaard, Kenosha, WI (US); Juris Sulcs, Chagrin Falls, OH (US); Craig D. Raleigh, Saukville, WI (US); Raymond A. Buchina, Mentor, OH (US); Alan J. Ruud, Racine, WI (US)

(73) Assignee: Fiberstars Incorporated, Fremont, CA (US)

( * ) Notice: Subject to any disclaimer, the term of this patent is extended or adjusted under 35 U.S.C. 154(b) by 0 days.

(21) Appl. No.: 09/539,652

(22) Filed: Mar. 30, 2000

(51) Int. Cl.[7] ........................................ F21V 29/00
(52) U.S. Cl. ..................... 362/580; 362/581; 362/551; 362/267; 362/345
(58) Field of Search ..................... 362/580, 581, 362/551, 294, 345, 373, 267, 304

(56) References Cited

U.S. PATENT DOCUMENTS

| | | | |
|---|---|---|---|
| 3,712,984 | 1/1973 | Lienhard | 250/504 H |
| 4,149,086 | 4/1979 | Nath | 250/504 R |
| 5,058,985 | 10/1991 | Davenport et al. | 385/115 |
| 5,099,399 * | 3/1992 | Miller et al. | 362/580 |
| 5,587,626 | 12/1996 | Parham et al. | 313/634 |
| 5,675,677 | 10/1997 | Davenport et al. | 385/31 |
| 5,676,579 | 10/1997 | Parham et al. | 445/58 |
| 5,812,714 | 9/1998 | Hulse | 385/39 |
| 5,826,963 | 10/1998 | Cassarly et al. | 362/551 |
| 5,927,849 * | 7/1999 | Cassarly et al. | 362/551 |
| 6,224,248 * | 5/2001 | Chiba | 362/580 |

OTHER PUBLICATIONS

Cassarly et al., "Comparison of Dual Focus Collector Schemes for Fiber Systems," SAE Paper No. 970254, presented at the Feb. 1997 SAE Congress, pp. 1–10.

W.T. Welford and R. Winston, High Collection Nonimaging Optics, New York: Academic Press, Inc. (1989), chapter 4 (pp. 53–76).

* cited by examiner

Primary Examiner—Sandra O'Shea
Assistant Examiner—Ronald E. DelGizzi
(74) Attorney, Agent, or Firm—Charles E. Bruzga (57) ABSTRACT

A light delivery system includes a light source. A first generally tubular, hollow coupling device with an interior light-reflective surface receives light from the source at an inlet and transmits it to an outlet. The coupling device increases in cross sectional area from inlet to outlet in such manner as to reduce the angle of light reflected from the surface as it passes through the device. A thermal-isolating region has an inlet positioned in proximity to an outlet of the coupling device and has an outlet for passing light to an optical member, the thermal-isolating region comprising one or more members. A waterproof container for the light source and coupling device has an aperture allowing light to pass out of the container. The aperture is sealed in part by a portion of a member of the thermal-isolating region. Advantageously, the system can be buried beneath the surface of the ground. This avoids the problem of people or equipment colliding with the system. The components in the sealed container are protected from intrusion by wildlife or deterioration from dirt and dust. In some embodiments, the container may be free of a fan, reducing the complexity and noise of the system.

19 Claims, 10 Drawing Sheets

WATERPROOF SYSTEM FOR DELIVERING LIGHT TO A LIGHT GUIDE

CROSS-REFERENCE TO RELATED APPLICATIONS

This invention is related to application Ser. No. 09/454,073, filed on Dec. 1, 1999, entitled "Efficient Arrangement for Coupling Light From a Light Source to a Light Guide," by Roger F. Buelow et al. It is also related to application Ser. No. 09/470,156, filed Dec. 22, 1999, and entitled "Method of Making Optical Coupling Device," by Juris Sulcs et al. The entirety of the disclosures of both these applications is incorporated herein by reference.

FIELD OF THE INVENTION

This invention relates to systems for delivering light to one or more light guides, and, more particularly, to a waterproof system.

BACKGROUND OF THE INVENTION

Lighting fixtures adapted for operation in outdoor environments are commonly used to illuminate optical fibers. These systems mounted above ground, employ exterior shields to protect the internal components from rain and water splashed from adjacent pools or ponds. The optical fibers may be positioned in decorative arrays around a pool or pond, and also illuminate the pool. Often, a color wheel is interposed between the light source and the inlet ends of the optical fibers to enhance the visual effects with colored light from the fibers. Cooling air is drawn into the housing, circulated around the inlet ends of the optical fibers and the light source, and then channeled from the fixture under a pressure differential established by a fan positioned along the cooling path of air flowing through the fixture.

Various attempts have been made to configure these lighting fixtures with a low profile above the ground, and to prevent the internal light source from leaking (spurious) light from the light box to the adjacent area. However, such above-ground fixtures are vulnerable to collision with people and moving equipment such as carts and bicycles, and to associated damage from such collisions. They are also vulnerable to intrusion by wildlife such as insects or rodents that may disturb sensitive components, or to dirt and dust that accumulates over time on the optics to reduce their light output.

Another approach is to channel the spurious light into a translucent globe and so make the light box visible. See, for example, U.S. Pat. No. 5,779,353, entitled "Weather-Protected Lighting Apparatus and Method." This approach, however, draws attention to the light source and away from the dramatic and aesthetically pleasing fiberoptic pool-lighting display.

It would be desirable to provide a lighting fixture with fiber connections that could be buried beneath the surface of the ground. This would require the lighting fixture to be completely sealed. This, in turn, would require the lighting fixture to be efficient enough to deliver ample illumination at a sufficiently low power to avoid the need for external cooling air.

SUMMARY OF THE INVENTION

In a preferred form, the invention provides a light delivery system including a light source. A first generally tubular, hollow coupling device with an interior light-reflective surface receives light from the source at an inlet and transmits it to an outlet. The coupling device increases in cross sectional area from inlet to outlet in such manner as to reduce the angle of light reflected from the surface as it passes through the device. A thermal-isolating region has an inlet positioned in proximity to an outlet of the coupling device and has an outlet for passing light to an optical member, the thermal-isolating region comprising one or more members. A waterproof container for the light source and coupling device has an aperture allowing light to pass out of the container. The aperture is sealed in part by a portion of a member of the thermal-isolating region.

Advantageously, the foregoing system can be buried beneath the ground. This avoids the problems of people or equipment colliding with the system. The components in the sealed container are protected from intrusion by wildlife or deterioration from dirt and dust. In some embodiments, the container may be free of a fan, reducing the complexity and noise of the system.

DETAILED DESCRIPTION OF THE INVENTION

Figure 1:
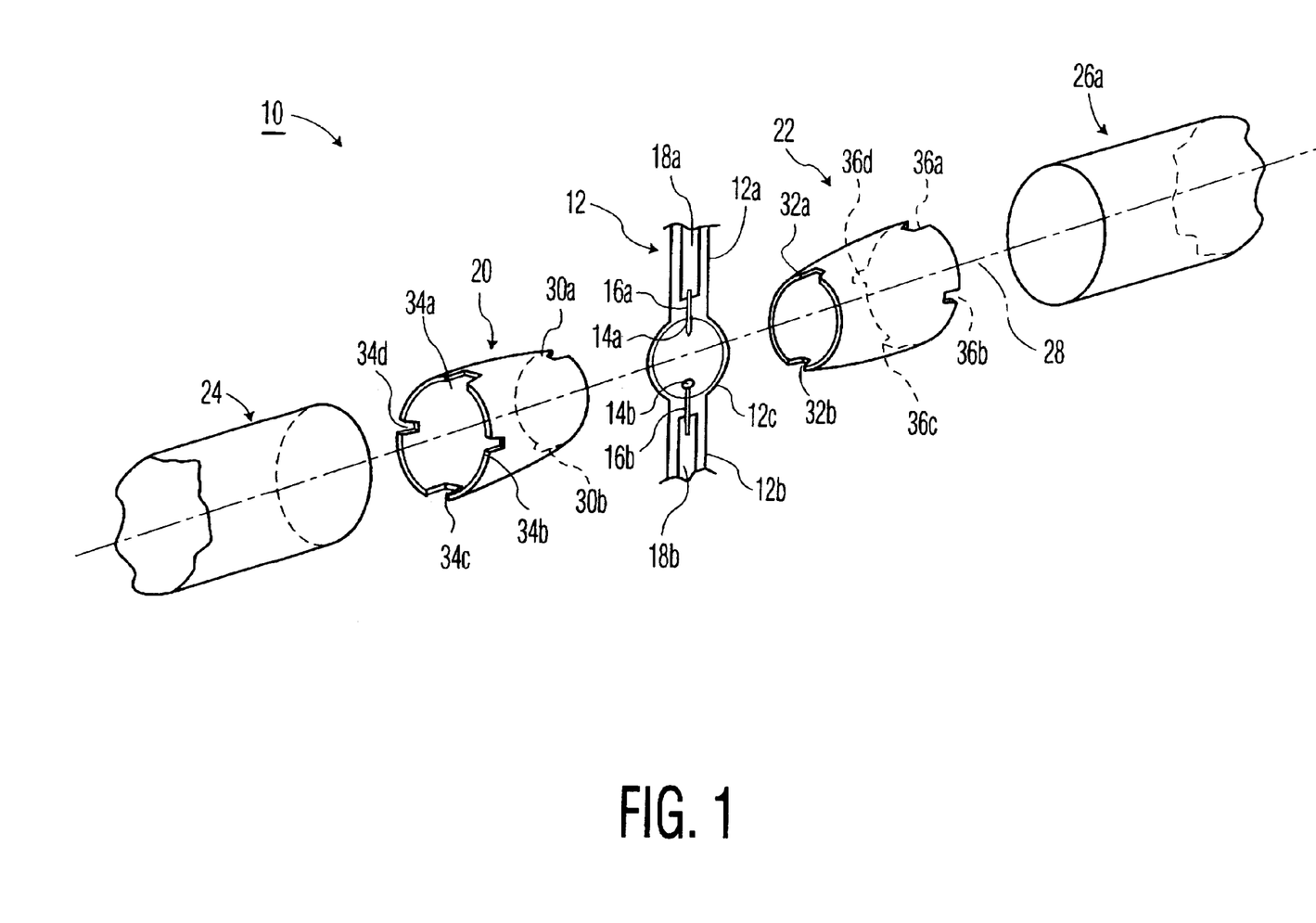
FIG. 1 is an exploded view of several elements of a light delivery system in accordance with the invention.

FIG. 1 is an exploded view of several elements of a light delivery system in accordance with the invention. A light source or lamp 12, shown partially cut away, has upper and lower legs 12a and 12b, and a central, bulbous portion 12c. When lamp 12 comprises a metal halide gas discharge lamp, for instance, the bulbous portion 12c contains electrodes 14a and 14b. These electrodes are connected to in-leads 16a and 16b respectively, which, in turn, are connected to foil in-leads 18a and 18b, respectively. Lamp 12 may alternatively comprise a formed halogen or other filament-type lamp (not shown), for instance, or an electrodeless lamp (not shown).

In a preferred arrangement, light from lamp 12 is captured by optical devices 20 and 22, and directed through thermal-isolating members 24 and 26, respectively, to respective light guides (not shown) for distribution to remote locations. Members 24 and 26 (and other "thermal-isolating members" described herein) are necessary to thermally isolate temperature-sensitive light guides (not shown) from the heat of lamp to prevent premature deterioration of the light guides. Plastic light guides are typically thermally sensitive, as well as glass light guides including thermally sensitive glue or other components. Each of devices 20 and 22 has an inlet facing the lamp, and an outlet facing a respective one of thermal-isolating members 24 and 26. The interior surface of each device is reflective to light from the lamp. Each coupling device increases in cross sectional area from inlet to outlet in such manner as to reduce the angles of light reflected from the inner surface as it passes through the device. It is preferred that substantially all cross-sectional segments along the interior of each coupling device taken through a central axis of light propagation 28 be substantially parabolic, or substantially conform to a CPC shape. CPC is a specific form of an angle-to-area converter, as described in detail in, for instance, W. T. Welford and R. Winston, High Collection Nonimaging Optics, New York: Academic Press, Inc. (1989), chapter 4 (pp. 53–76).

The inlet of coupling device 20 has recesses 30a and 30b, and similarly the inlet of coupling device 20 has recesses 32a and 32b. These recesses receive respective portions of upper and lower legs 12a and 12b of the lamp, and enable the coupling devices to hold the lamp. In the case of an electrodeless lamp (not shown), the recesses could receive a gas probe of a starting aid projecting from one side of a bulbous portion of the lamp and another projection from another side of the bulbous portion.

The outlet of coupling device 20 has recesses 34a, 34b, 34c and 34d, and similarly the outlet of coupling device 22 has recesses 36a, 36b, 36c and 36d. These recesses may be used to align the coupling devices with a framework (not shown), as will be described below.

Each of thermal-isolating members 24 and 26 may comprise a single device, or it may comprise multiple devices such as a pair of semi-cylindrical devices (not shown) or four quarter-cylindrical devices (not shown). Each of members 24 and 26 or any of its included devices could be hollow if desired. Quartz may be used for member 24 or 26, although other refractory materials that can withstand the heat from lamp 12 without degrading the lamp or light guide can be used, such as high temperature borosilicate glass. Alternatively, each of members 24 and 26 may comprise an extension (not shown) of its associated coupling device with a cross section in the direction of light propagation that may be substantially constant, as opposed to the changing cross sections of members 24 and 26 as shown.

Figure 2:
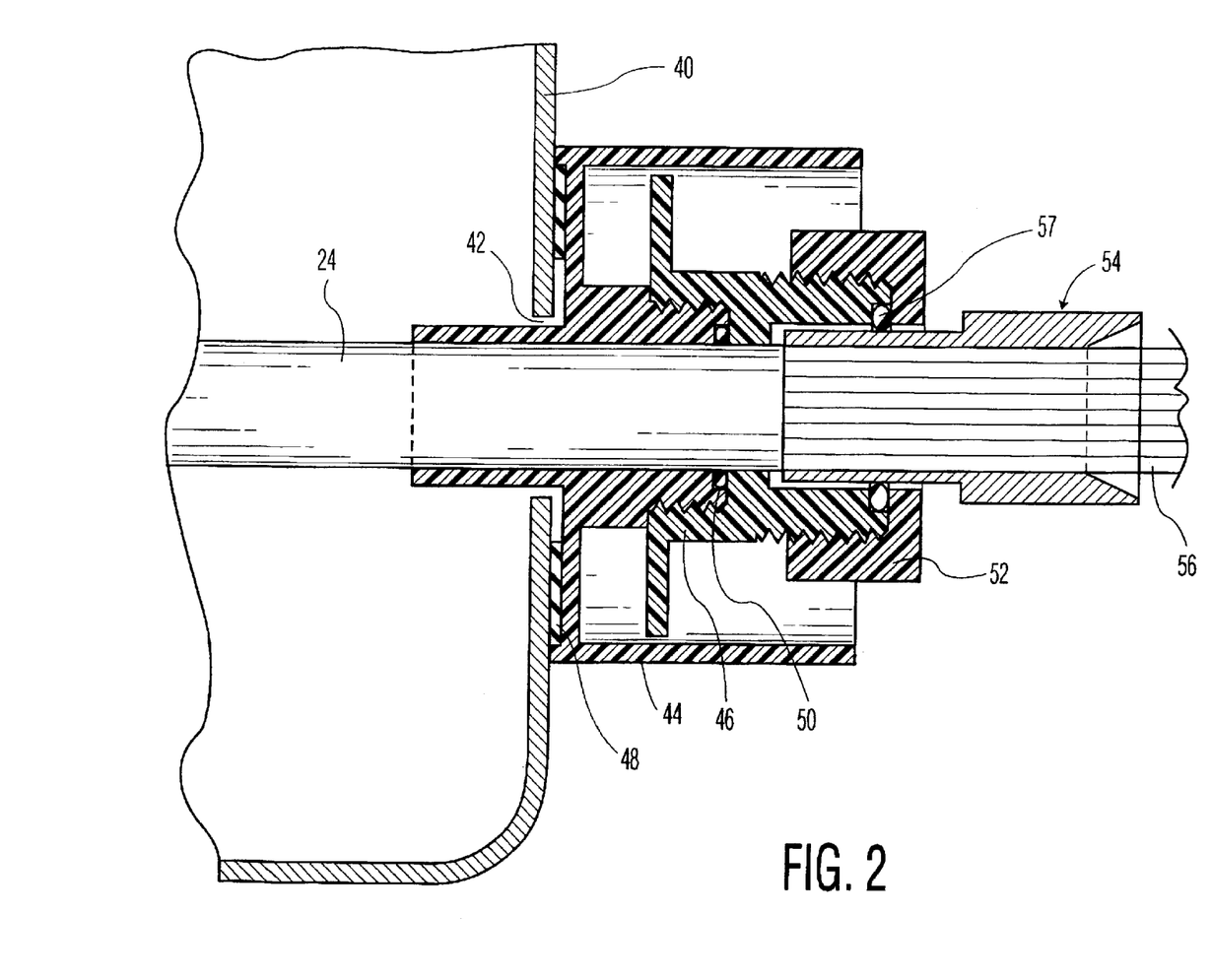
FIG. 2 is a side plan view, partially in section and partially cut away, showing arrangements for sealing a thermal-isolating member to a waterproof container and for sealing a termination of a light guide.

FIG. 2 shows a waterproof container 40 having an aperture 42 through which a portion of thermal-isolating member 24 extends. Aperture 42, which allows light to pass outside of the container, is sealed in part by thermal-isolating member 24. It is further sealed by a sealing arrangement including a first hub member 44 and a second hub member 46. Hub member 44 may be sealed to the left-shown side of container 40 by a ring-like seal 48. Second hub member 46 is coupled to the first hub member, preferably by threads as shown, and together press a ring-like seal 50 against the circumference of thermal-isolating member 24. To minimize surface contact between seal 50 and member 24, the thickness of the seal is preferably small, such as 1 mm where member 24 has a diameter of 19 mm. This minimizes light leakage from member 24. To further reduce light leakage, the exterior of seal 50 preferably comprises material with a substantially lower index of refraction (e.g., 1.3) than that of region 24 (e.g., 1.5). Such low index material may comprise a fluoroelastomer from the family of copolymers and terpolymers made with tetra-fluro-ethylene and hexa-fluro propylene. One such material is sold by DuPont Corp. of Wilmington, Delaware, under the trademark TEFLON.

For compactness, a third hub member 52 (FIG. 2) may be coupled to second hub member 50 for scaling a termination 54 of a light guide 56 against water, etc. Where light guide 56 is stranded, as shown, its termination 54 may take the form of a nipple as shown. In contrast, a solid-core light guide (not shown) does not typically require additional structure such as a nipple at its termination; it may properly terminate simply by being cut to a desired length. Hub members 50 and 52 cooperate to press a ring-like seal 57 against the outer circumference of termination 54.

Figure 3:
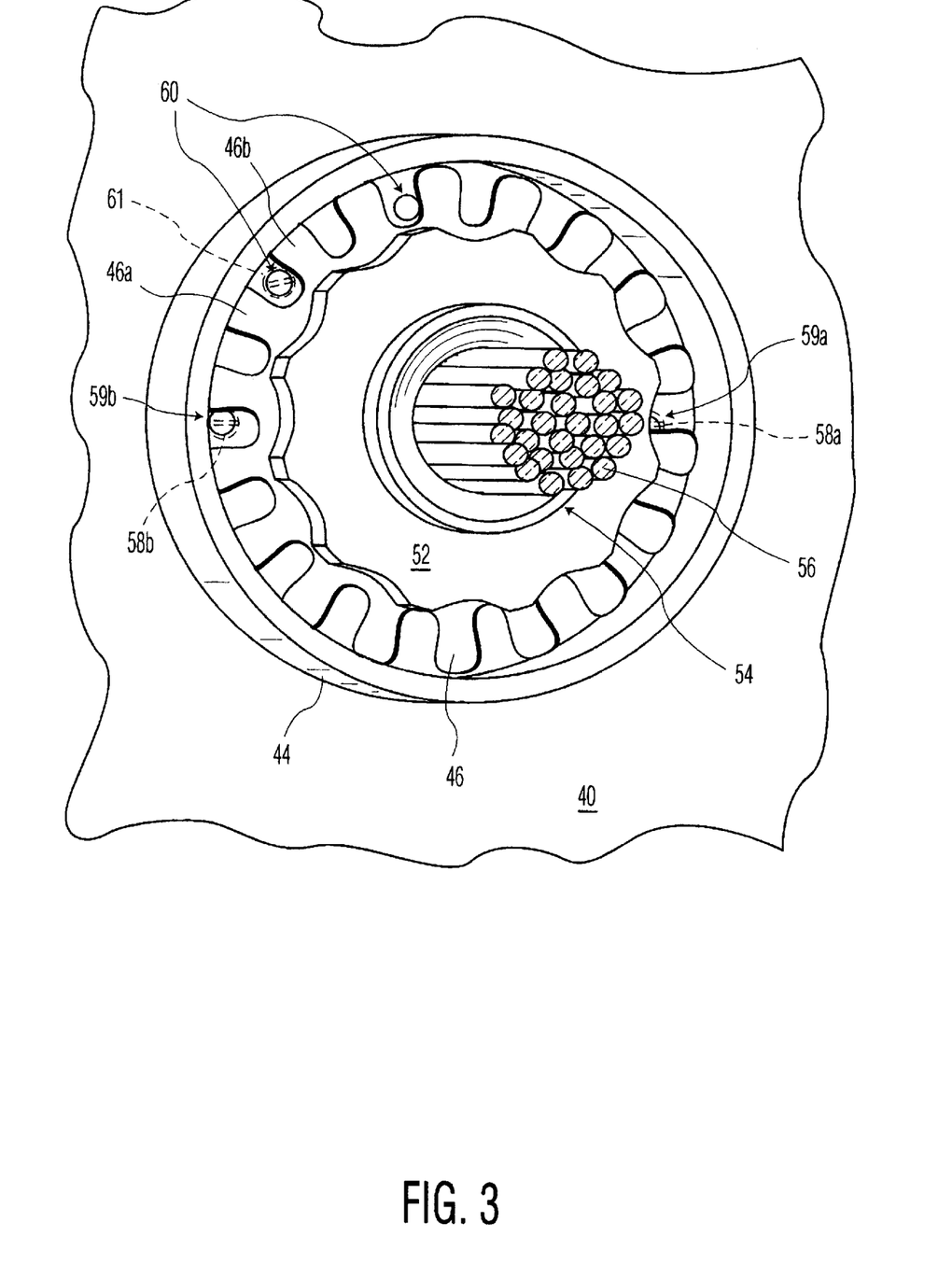
FIG. 3 is a side plan view, partially in cross section and partially cut away, of the structure shown in FIG. 2.

FIG. 3 shows a side view of first hub member 44 mounted on container 40, with third hub member 52 coupled to second hub member 46. Termination 54 surrounds fibers 56, which are shown in cross section. To secure the first hub member to the container, bolts 58a and 58b (shown in phantom) may pass through holes 59a and 59b in the first hub member and corresponding holes (not shown) in container 40.

First hub member 44 may include partial holes 60 so that a bolt 61 (shown in phantom) may pass between outward projections 46a and 46b of hub member 46 and into one of such a holes for locking the position of such hub member.

The features of FIGS. 2 and 3 regarding thermal-isolating member 24 and light guide 56, for instance, are preferably duplicated for thermal-isolating member 26 (FIG. 1) and a further light guide (not shown).

Figure 4A:
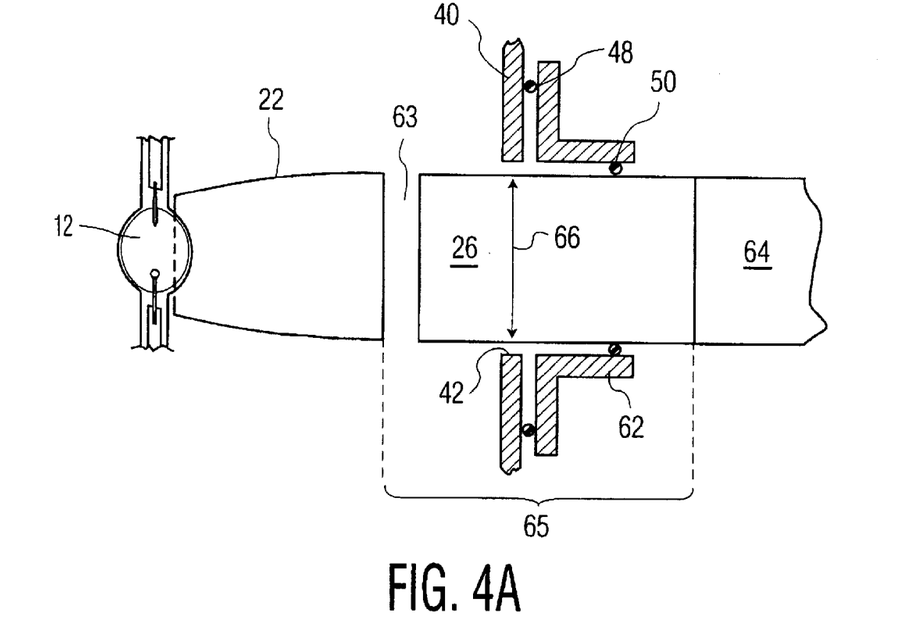
FIGS. 4A and 4B are side plan views, in simplified form, an arrangement for sealing a thermal-isolating region to a waterproof container when a light coupling device and an elliptical reflector are respectively used to deliver light to such region.

FIG. 4A shows in simplified form various parts of a light delivery system, to illustrate different sealing arrangements. Thermal-isolating member 26 passes through aperture 42 of container wall 40 and through a hub arrangement 62 representing a simplified view of the hub arrangement of FIG. 2 that comprises first and second hub members 44 and 46. Ring-like seals 48 and 50 may be the same as those shown in FIG. 2. Lamp 12 provides light that is directed through coupling device 22 and an air gap 63 to reach thermal-isolating member 26, where it is then passed to a light guide 64, shown in simplified form. Collectively, air gap 63 and thermal-isolating member 26 form a thermal-isolating region 65, which isolate the typically thermally sensitive light guide 64 from the heat of lamp 12.

In the embodiment of FIG. 4A, the ratio of the average diameter of the main light-transmitting portion of aperture 42 (e.g., 66) to the average (i.e., left-to-right shown) length of the main light-transmitting portion of member 26 is less than one.

Figure 4B:
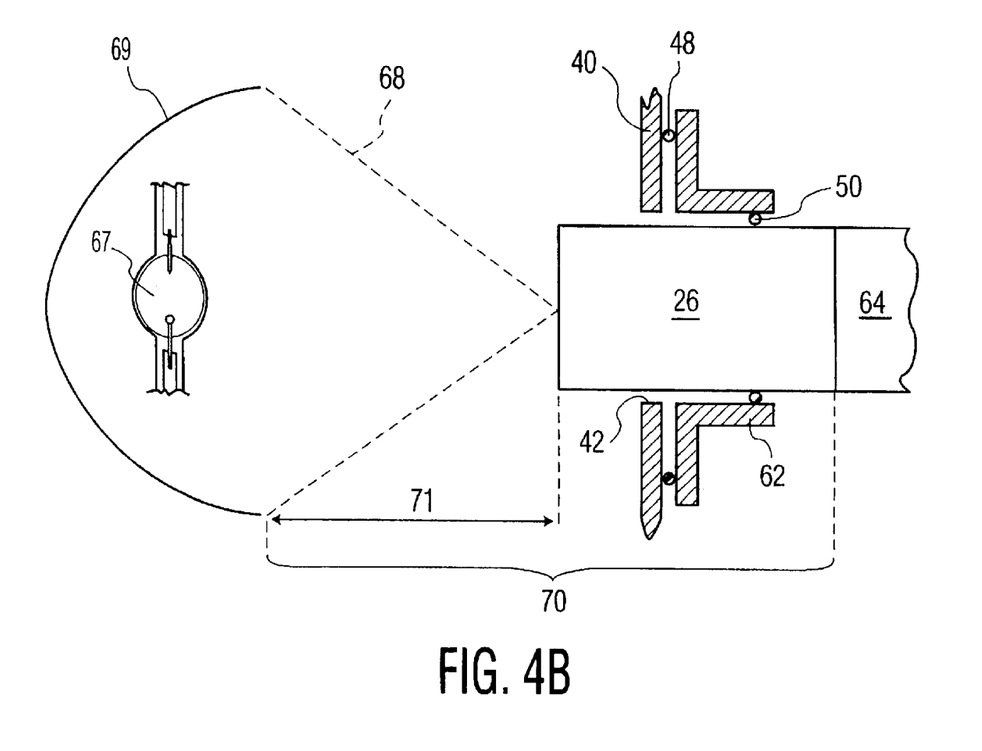

FIG. 4B is substantially similar to FIG. 4A except for the use of a lamp 67 whose rays 68 are directed by a generally semi-spherical, elliptical reflector 69 to the left-shown side of member 26. Lamp 67 may be substantially similar to lamp 12 of the various figures herein. In FIG. 4B, the thermal-isolating region includes an air gap 71 between reflector 69 and member 26, in addition to member 26 itself. The foregoing ratio mentioned in connection with FIG. 4A also applies to FIG. 4A.

Figure 4C:
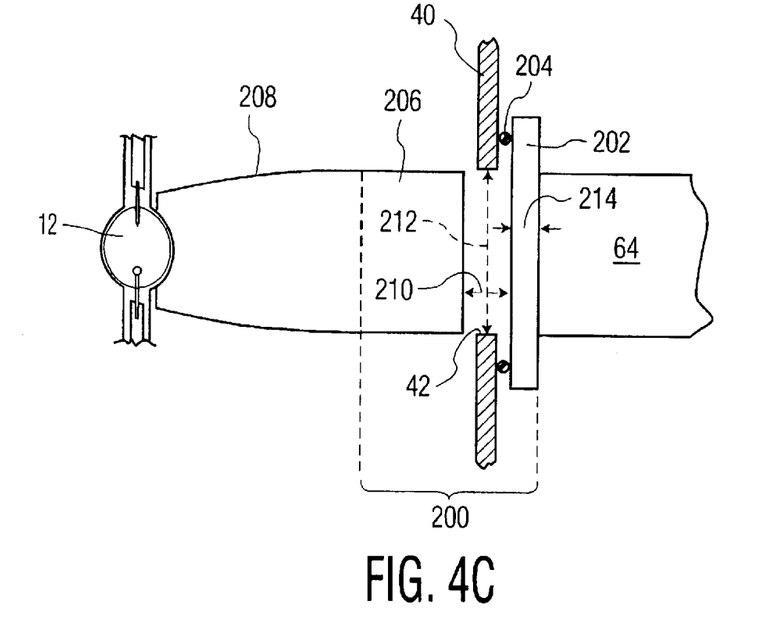
FIGS. 4C and 4D are side plan views, in simplified form, an arrangement for sealing another thermal-isolating region to a waterproof container when a light coupling device and an elliptical reflector are respectively used to deliver light to such region.

FIG. 4C shows a further variation on a light delivery system in which a thermal-isolating region 200 includes a member in the form of a plate 202 sealed to container wall 40 by a ring-like seal 204. The mechanical details of placing seal 204 under pressure, which will be routine to those of ordinary skill in the art, have been omitted. Thermal-isolating region 200 additionally includes a cylindrical extension 206 of a coupling device 208, which otherwise may be similar to coupling device 22 of FIG. 1, and also includes an air gap 210.

In the embodiment of FIG. 4C, the ratio of the average diameter of the main light-transmitting portion of aperture 42 (e.g., 212) to the average length of a main light-transmitting portion of thermal-isolating member 202 (e.g., 214) most proximate the aperture is greater than one.

Figure 4D:
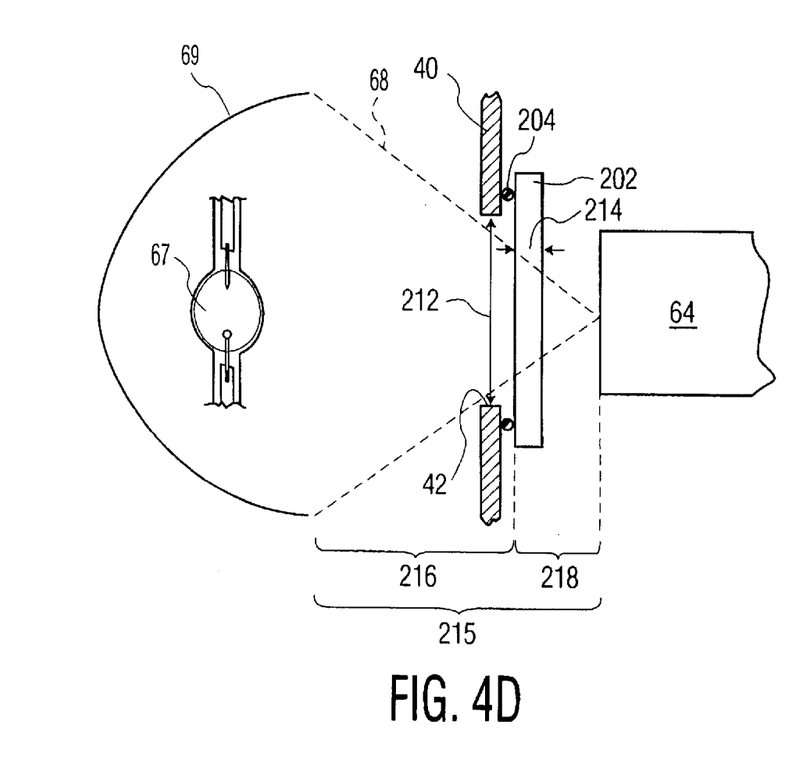

FIG. 4D is substantially similar to FIG. 4C except for showing a lamp 67 and reflector 69 (as in FIG. 4B) focusing rays 68 from lamp 67 onto the right-shown surface of light guide 64. Lamp 67 may be substantially similar to lamp 12 of the various figures herein. Additionally, a thermal-isolating region 215 includes an air gap 216 between reflector 69 and thermal-isolating member 202, and an air gap 218 between member 202 and light guide 64. The foregoing ratio mentioned in connection with FIG. 4C also applies to FIG. 4D.

Preferably, the inside of container 40 is free of a fan. This can result from one or more of: (1) isolating the temperature-sensitive, typically plastic light guide (e.g., 56, FIG. 2) from the heat of the lamp by use of a thermal-isolating region including a thermal-isolating member (e.g., 24 or 26, FIG. 1); (2) using light coupling devices as described above, which are highly efficient; (3) using an electronic ballast (not shown) mounted in a separate chamber (not shown) from the lamp and coupling devices; (4) forming container 40 of a thermally conductive material, such as aluminum, so that its large surface area radiates a substantial portion of the heat produced by the lamp; and (5) designing components within the container to operate in a high ambient temperature without lowering their expected life; for example, for the lamp, increasing the length of its foil in-leads so that heat from its environment and from its arc source does not cause such leads to destructively oxidize.

Figure 5:
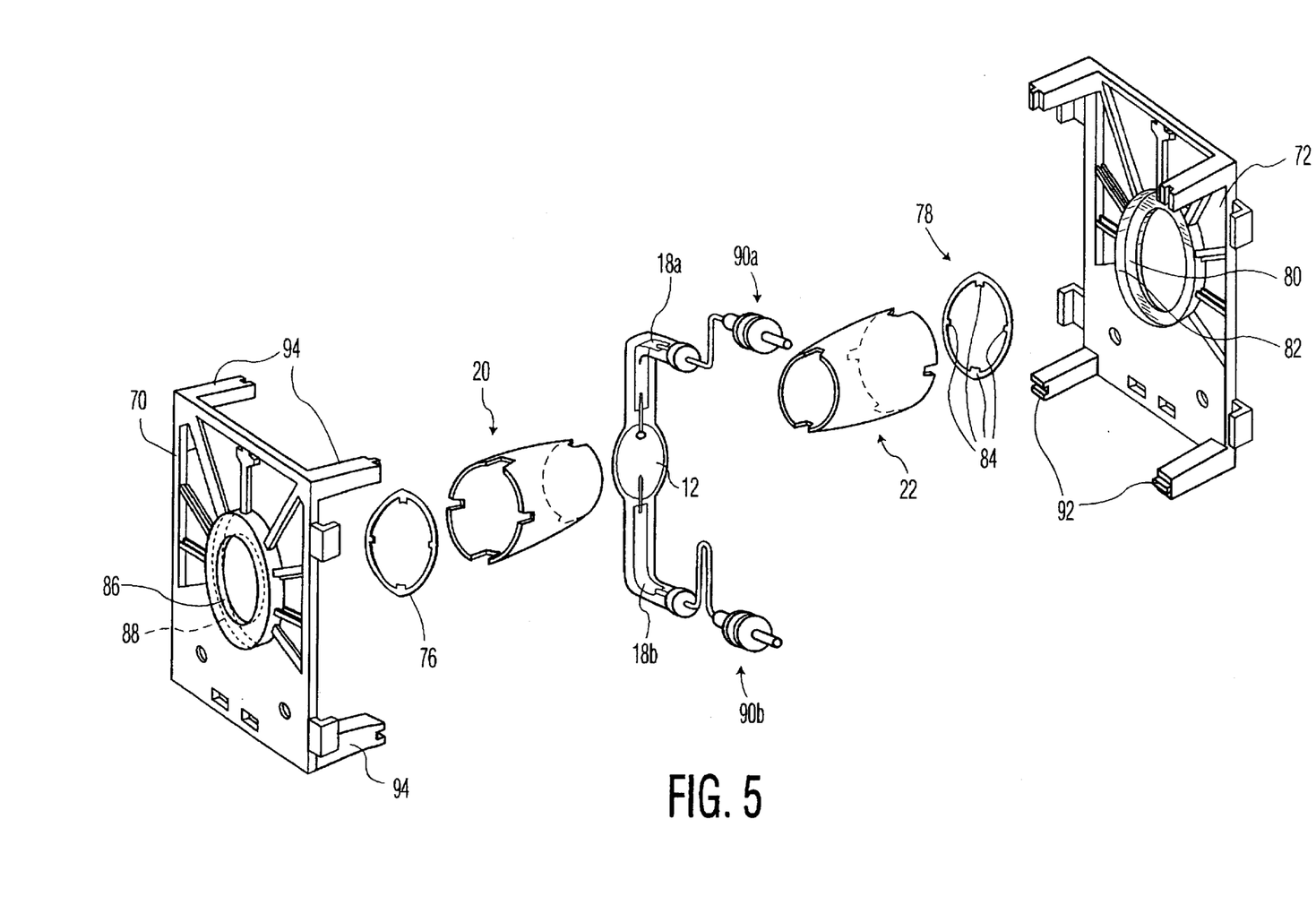
FIG. 5 is an exploded view of a framework for holding the light coupling devices and lamp of FIG. 1.

FIG. 5 shows an exploded view of a framework including frame members 70 and 72 of zinc, for instance, for holding coupling devices 20 and 22 (FIG. 1) and lamp 12. One or more wave washers 76 and 78, or other resilient means, are used to achieve an arrangement for holding the coupling devices in a manner allowing considerable manufacturing tolerances in their length, for instance.

Figure 6A:
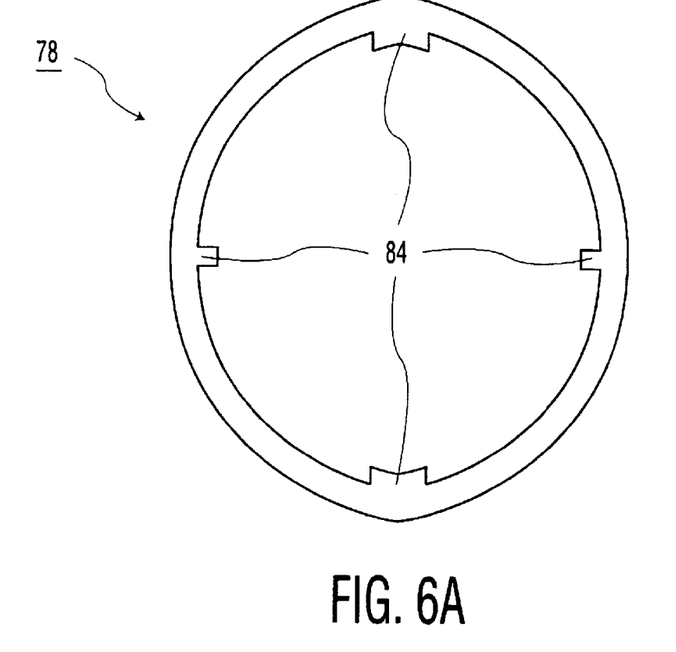
FIGS. 6A and 6B are front and side view respectively of a wave washer used in the framework of FIG. 5.
Figure 6B:
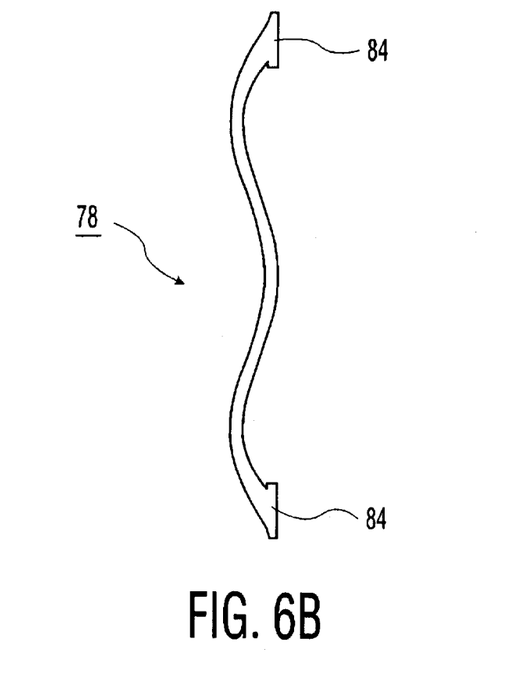

A supporting wall 80 of frame member 72 supports the right-hand shown side of wave washer 78, which may have the shape of a cross-section of a clamshell, i.e., a shape formed by joining two arcs each of less than 180 degrees. A lateral support wall 82 maintains proper rotational alignment of the wave washer by, for instance, also having the shape of a cross-section of a clamshell, as shown. Washer 78 has inward projections 84 for being received by recesses 36a–36d of coupling device 22. This limits axial movement of the device along a main axis of light propagation, while also maintaining proper rotational alignment of the coupling device. FIGS. 6A and 6B respectively show a front view and a side view of washer 78 to better illustrate projections 84 and preferred bends in the washer that flatten to accommodate manufacturing tolerances in the axial length of coupling device 22, for instance. Similarly, frame member 70 has a supporting wall 86 (shown in dashed lines) and a lateral support wall 88 corresponding to the like-named walls of frame member 72 for interacting in a similar manner with wave washer 76 and coupling device 20.

Axial movement of coupling device 22 can also be achieved other than by using recesses 36a–36b. For instance, the outer perimeter of the outlet of such device can be configured with radially outward facing bumps (not shown) that cooperate with inward projections (not shown) of wave washer 78 that may be generally similar to projections 84. If desired to maintain proper rotational alignment of the coupling device, one or more inward projections can be each configured to partially wrap around both sides of an associated bump along a main axis of light propagation.

If desired, one of the wave washers may be omitted. Alternatively, a wave washer may be replaced by other resilient means, such as a plurality of small coil springs (not shown) for pressing against a plurality of points of the outlet of an adjacent coupling device.

Figure 7:
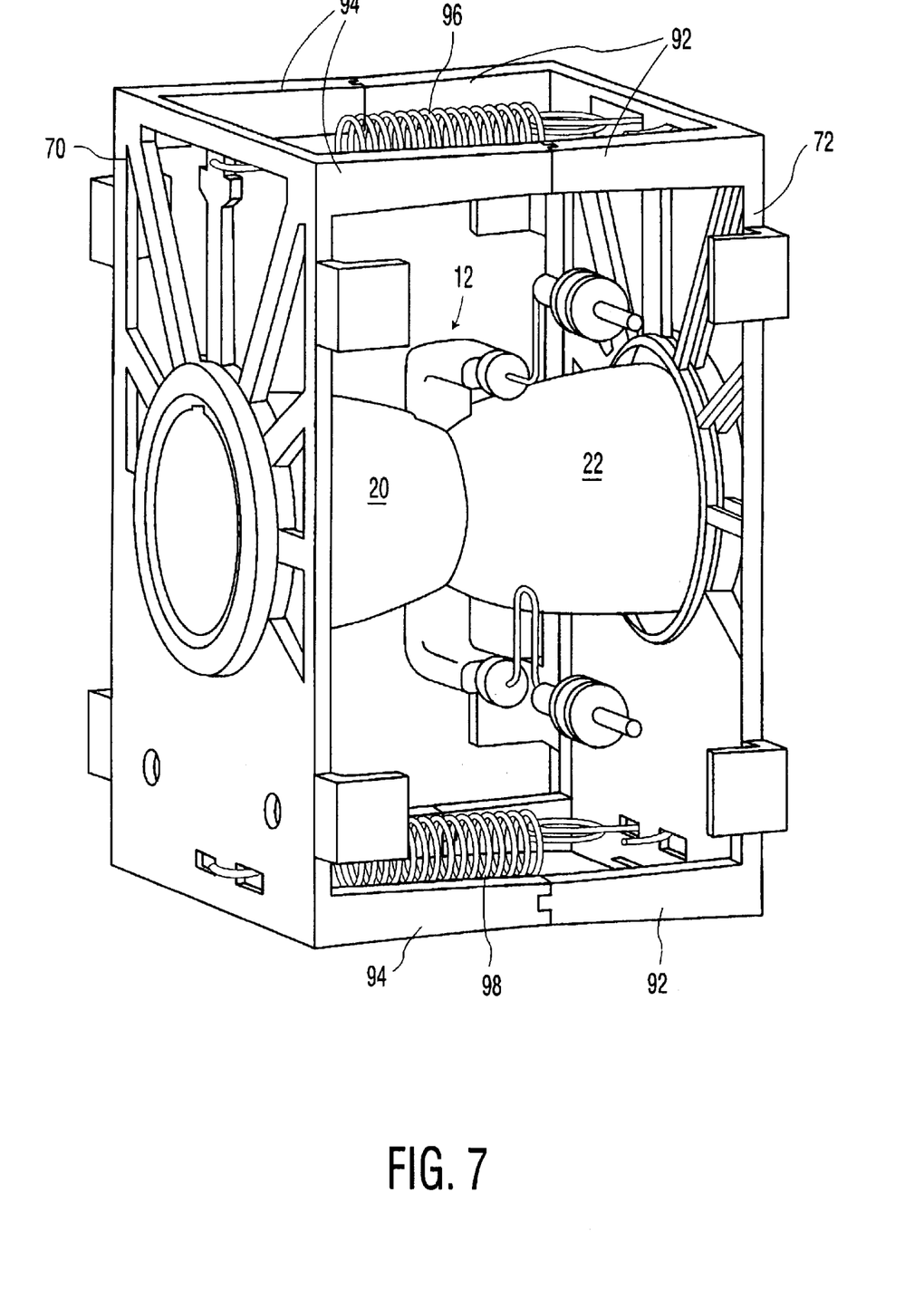
FIG. 7 is an assembled view, in perspective, of the framework of FIG. 5.

Arms 92 of frame member 72 preferably join respective arms 94 of frame member 70 in a non-telescoping manner as results, for instance, from the configuration of the ends of such arms as shown. This assures that the resilient force placed on coupling devices 20 and 22 is governed by the wave washers (or alternative resilient means) rather than by any additional resilient force (not shown) pressing together the frame members. Such additional resilient force may be provided by upper and lower coil springs 96 and 98, respectively, as shown in the assembled view of frames 70 and 72 in FIG. 7.

Figure 8:
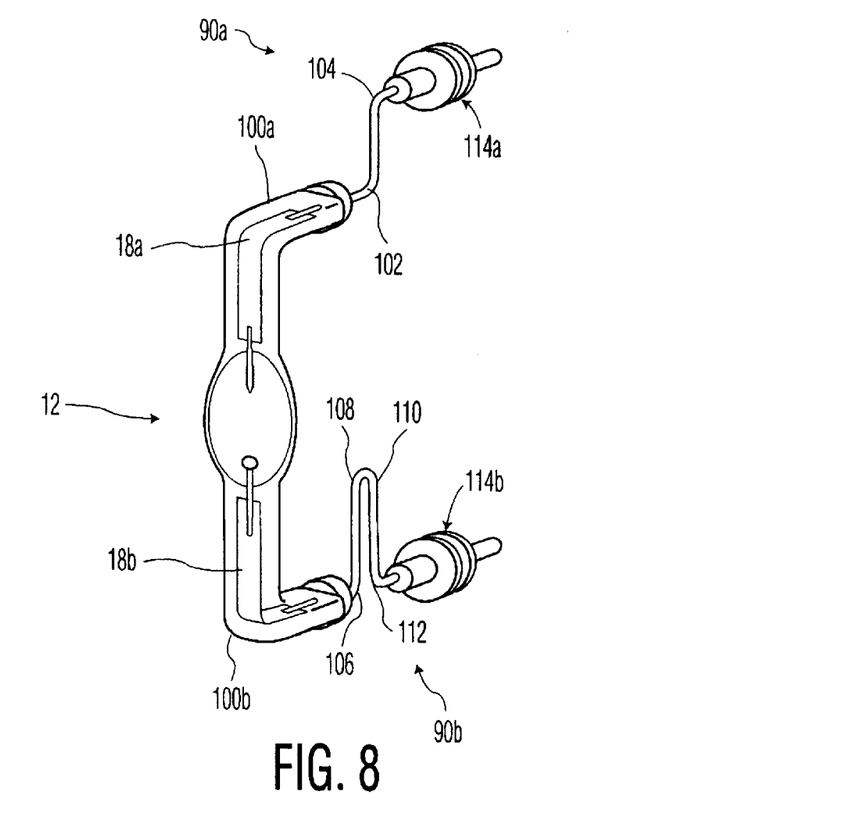
FIG. 8 is a side plan view of a lamp used in the framework of FIG. 5.

As shown in FIG. 5, both foil in-leads 18a and 18b of the lamp incorporate bends, as well as in-lead portions 90a and 90b. FIG. 8 shows these bends in more detail. Thus, bends 110a and 100b in in-leads 18a and 18b result in a compact profile for the lamp. In-lead portion 90a incorporates "knee"-type (or generally orthogonal) bends 102 and 104, while in-lead portion 90b incorporates knee-type bends 106, 108, 108 and 112. The foregoing bends allow in-leads 90a and 90b to flex relative to the vitreous-covered in-lead portions 18a and 18b (e.g., by 4 mm) so that the coupling of these leads to respective female conductors (not shown) will not dislodge the lamp from a desired position supported, for instance, by coupling members 20 and 22 (e.g., FIG. 7).

Alignment structure 114a and 114b (FIG. 7) may be provided for aligning in-leads 90a and 90b.

Example of Forming Coupling Device

Coupling devices having a circular cross-section along a main axis of light propagation provide good results. However, because the thermal isolating device (e.g., a quartz rod) receives only a portion of the output, a design that has a smaller output area while giving the same or better angular transformation would be more efficient.

Figure 9:
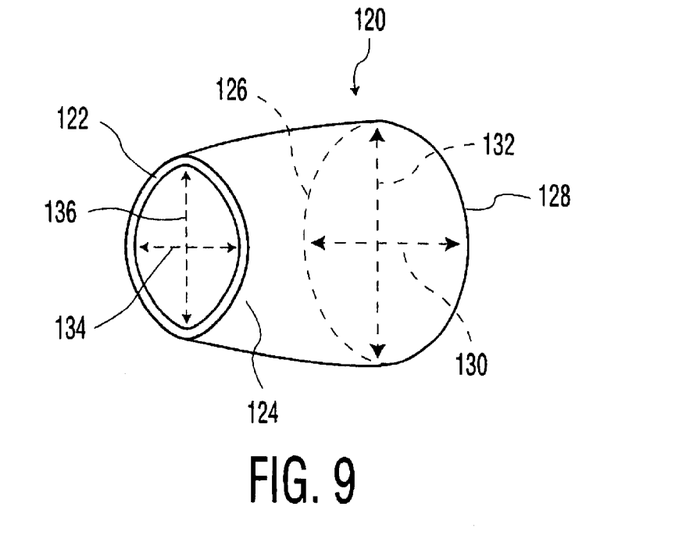
FIG. 9 is a simplified, perspective view of a light-coupling device in accordance with the invention.

In order to decrease the output area without harming the angular transformation, the input area must be decreased. This is not possible with a circular cross-sectioned device, but is possible with a modified coupling device (or angle-to-area converter) with a clamshell shaped (or oblong) cross section that more closely matches the shape of the arc chamber. FIG. 9 shows such a design for a coupling device 120, simplified to omit recesses at either end.

One way to make an oblong cross section is to brine together two arc-shaped segments of less than 180 degrees. If two 142° segments of a 14 mm diameter circle are brought together the resulting shape is 13.25 mm tall by 9.5 mm wide, large enough to accept a 68-watt metal halide DC arc lamp.

The shape of an oblong coupling device (or angle-to-area converter) was constructed by first designing a device with a 14 mm input and a 38 degree output. This shape was then sectioned and replicated such that its input was the union of two 142° arc segments 122 and 124 of a 14 mm input circle (not shown).

In order to make sure that the angular conversion of the device was at most 38 degrees, the angle of the segment 122 or 124 of each section was increased as the diameter increased. This translates to greater area and therefore conversion to even lower angles.

The output of the oblong angle-to-area converter is the union of two 156° segments 126 and 128 of a 22.8 mm diameter circle (not shown). Coupling device 120 works in much the same manner as a device defining a compound parabolic concentrator (CPC). The shape of each of the two sections follows the equations for a CPC as described by the above-cited Winston and Welford reference except for the location of the optical axis. The majority of the light (e.g., more than 75%) reflects from a wall only once. For these single-reflection rays, the oblong device acts exactly as it would in the case of a true CPC that the section emulates. The oblong device gives increased efficiency over the true CPC because:

1. The ratio of output area to input area is greater in the oblong converter described here, resulting in light converted to lower angles;

2. The output area of the CPC is 15% larger than the oblong converters. Since our thermal isolator collects only a set area of the output, and this area is a greater percentage of the smaller oblong converter, the isolator therefore collects more light.

Oblong device 120 formed according to the foregoing principles has an output 126, 128 with a ratio of minor axis 130 to major axis 132 that substantially exceeds the ratio of minor axis 134 to 136 of its input 122, 124. Preferably, the increase in such ratios from input to output causes substantially all light to be received by a first light guide (not shown) having a first acceptance angle (e.g., 38 degrees) while ensuring that a second, alternative light guide (not shown) having a substantially lower acceptance angle (e.g., 30 degrees) receives a substantial (i.e., useful) amount of light. More preferably, the increase in such ratios is sufficient to maximize the amount of light received by the second light guide. In this way, a single coupling device can efficiently accommodate either the first or second light guides, which may typically be a solid-core light guide and a stranded-core light guide, respectively.

Figure 10:
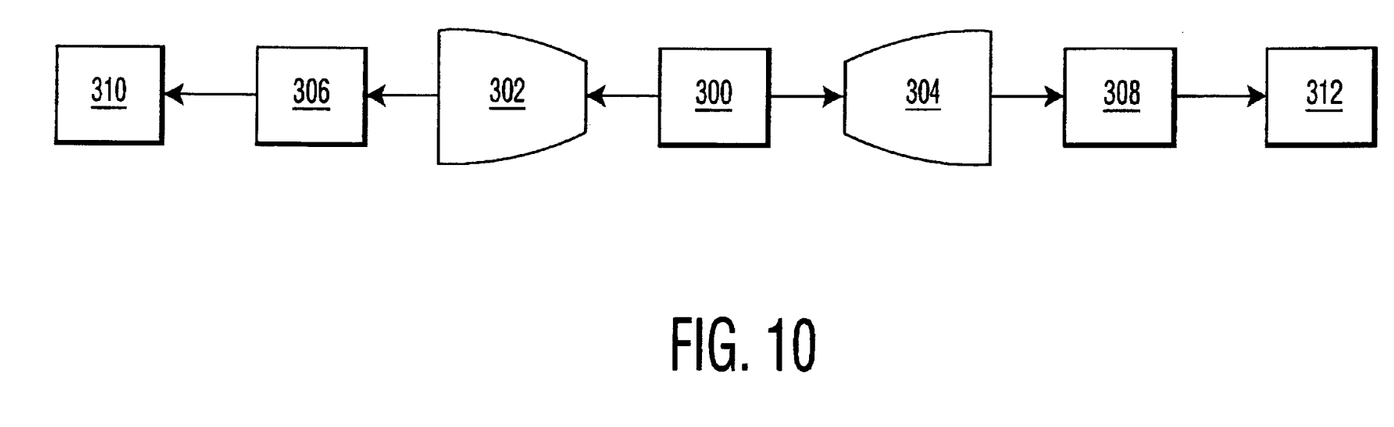
FIG. 10 is a view of a light delivery system using principles of the coupling device of FIG. 9, partially shown in block diagram form.

FIG. 10 shows a light delivery system including a light source 300, light-coupling devices 302 and 304, thermal-isolating regions 306 and 308, and light guides 310 and 312. These parts are like the like-named parts above. The system provides a useful light level to both light guides 310 and 312 when they are of the stranded-core and solid-core types, respectively, and when devices 302 and 304 are substantially identical to each other and made according to the principles of FIG. 9. Alternatively, the system provides a useful light level to light guide 310, for instance, whether embodied as a stranded-core or a solid-core fiber, when light-coupling device is made according to the principles of FIG. 9.

When made of ceramic, casting can form a coupling device. When made of quartz or other vitreous material, a coupling device can be formed by blow molding in a similar way as a quartz arc tube with a bulbous region (not shown) along a main axis of the arc tube. The bulbous region typically has a maximum diameter at its midpoint along the axis, and tapers in diameter towards both of its axial ends. A respective coupling device can be cut from each tapered section, with its interior made reflective.

For either circular or non-circular cross-sectioned devices, an outwardly extending ridge (not shown) preferably extends around the bulbous region at the midpoint to facilitate alignment of a cutting instrument and to reduce the chance of fracturing the bulbous region during cutting. The ridge can be formed by applying a narrow zone of heat to the region in a special gathering step.

In making coupling devices, reference can generally be made to prior art techniques for making arc tubes for forming a structure similar to an arc tube with a bulbous region. Additionally, manufacturing tolerances should be kept especially low to substantially achieve an optically desired shape. Maintaining an accurate mold shape, accurately centering a tube of quartz, etc., and accurately positioning the mold on the tube can accomplish this, for instance. These measures will be routine to those of ordinary skill in the art from the present specification.

A special consideration arises when making devices with non-circular (e.g., oblong) cross sections along the central axis of light propagation. Since a mold directly shapes only the exterior of the device whereas only the interior surface is used for reflection, the bulbous region is varied in thickness to result in a desired interior surface topology.

When forming coupling devices from the foregoing molding process, the thickness of the device wall will typically be greater at its inlet than at its outlet.

The foregoing describes a process of producing an arc tube-like structure. Cutting the structure at axial points can then produce axial sections of such structure. This is preferably accomplished with a cutting device, such as a diamond wheel, preferably wet, or a laser. Alternatively, by way of example, the technique of score-snapping can be used by circumferentially scoring, or scratching, the structure at an axial point, and then bending the ends of the structure about such point.

Cuts may and then be made in the resulting axial sections to form the various recesses described above, e.g., recesses 32a, 32b and 36a–36b of coupling device 22 shown in FIG. 1. The cutting may be made by a diamond wheel (not shown), preferably wet, used in the manner of a radial arm saw; that is, with the wheel in the plane of the central longitudinal access (not shown) of the structure. Such diamond wheel is preferably shaped to conform to the desired shape of a recess. Thus, for a round recess, the tip of the wheel is preferably rounded in cross section taken transverse to its axis.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A light delivery system comprising:

a) a light source;

b) a first generally tubular, hollow coupling device with an interior light-reflective surface for receiving light from the source at an inlet and transmitting it to an outlet; the coupling device increasing in cross sectional area from inlet to outlet in such manner as to reduce the angle of light reflected from the surface as it passes through the device;

c) a thermal-isolating region having an inlet positioned in proximity to an outlet of the coupling device and having an outlet for passing light to an optical member; the thermal-isolating region comprising one or more members; and d) a waterproof container for the light source and coupling device, the container having an aperture allowing light to pass out of the container; the aperture being sealed in part by a portion of a member of the thermal-isolating region.

2. The system of claim 1, wherein the ratio of the average diameter of a main light-transmitting portion of the aperture to the average length of a main light-transmitting portion of a member of the thermal-isolating region most proximate to the aperture is greater than one.

3. The system of claim 1, wherein a first arrangement for sealing the aperture comprises:
   a) a first ring-like seal having an exterior comprising material with a substantially lower index of refraction than that of a member of the thermal-isolating region;
   b) the seal being hermetically pressed against such member.

4. The system of claim 3, wherein the first sealing arrangement includes a hub arrangement comprising:
   a) a first hub member through which at least a portion of a member of the thermal-isolating region passes and which is sealed to a side of the container; and
   b) a second hub member coupled to the hub in such manner as to press the first ring-like seal against a member of the thermal-isolating region.

5. The system of claim 4, wherein a second sealing arrangement associated with a light guide having a termination comprises a third hub member coupled to the second hub member in such manner as to press a second ring-like seal against the termination.

6. The system of claim 1, wherein the container is free of a fan.

7. The system of claim 1, wherein:
   a) the coupling device is configured with a cross section along a central axis of light propagation having a clamshell shape with a minor axis and a major axis; and
   b) the ratio of the minor axis to major axis increases substantially between input and output so that substantially all light may be receive by a first light guide having a first acceptance angle for light while ensuring that an alternative, second light guide having a substantially lower acceptance angle receives a substantial amount of light.

8. The system of claim 1, further comprising:
   a) a second, generally tubular, hollow device arranged about the light source in generally mirror-like fashion to the first-mentioned hollow device; and
   b) a framework for the first and second devices comprising:
      i) first and second frame members for pressing together and holding the respective outlets of the first and second devices; and
      ii) at least a first resilient means supported by the first frame member for pressing against a plurality of points of the outlet of the first device.

9. The system of claim 8, wherein the first and second frames members are joined together in a non-telescoping, fixed relation to each other.

10. The system of claim 8, wherein the framework further comprises a second resilient means supported by the second frame member for pressing against a plurality of points of the outlet of the second device.

11. The system of claim 8, wherein the first resilient means comprises a wave washer.

12. The system of claim 8, further including means to prevent rotation of the first and second devices with respect to the first and second frame members.

13. The system of claim 1, further including:
   a) a second generally tubular, hollow coupling device substantially similar to the first coupling device and arranged about the light source in generally mirror-like fashion to the first-mentioned coupling device;
   b) the first coupling device being optimized to deliver light substantially within a first acceptance angle of a solid-core light guide and the second coupling device being optimized to deliver light substantially within a second acceptance angle of a stranded-core light guide, where the second acceptance angle is substantially lower than the first acceptance angle.

14. The system of claim 1, wherein the light source comprises:
   a) a first in-lead contained within an a bulbous region and aligned with a main axis;
   b) a first foil lead connected to the first in-lead and covered with vitreous material; and
   c) a third in-lead connected to the first foil lead;
   d) the first foil lead having a bend substantially transverse to the main axis.

15. The system of claim 14, wherein the third in-lead has a plurality of bends allowing it to flex without dislodging the arc chamber from a desired position when the system is assembled.

16. The system of claim 14, wherein the light source further comprises:
   a) a second in-lead contained within the bulbous region and aligned with the main axis;
   b) a second foil lead connected to the second in-lead and covered with vitreous material; and
   c) a fourth in-lead connected to the second foil lead;
   d) the second foil lead having a bend substantially transverse to the main axis.

17. The system of claim 16, wherein the third and fourth in-leads each has a plurality of bends allowing it to flex without dislodging the arc chamber from a desired position when the system is assembled.

18. A light delivery system comprising:
   a) a light source;
   b) an optical device for collecting light from the lamp and decreasing its angular distribution for being accepted by a light guide;
   c) a thermal-isolating region having one or more members and comprising an inlet positioned in proximity to an outlet of the coupling device and having an outlet for passing light to an optical member; and
   d) a waterproof container for the light source and optical device, the container having an aperture though which a generally cylindrical portion of a thermal-isolating member extends; and an arrangement for sealing a member of such region to a border of the aperture;
   e) the generally cylindrical portion having an average length along a main direction of light propagation that is more than the average dimension of a main light-transmitting portion of the aperture.

19. The system of claim 18, wherein the container is free of a fan.

* * * * *